(12) United States Patent
Mukherji et al.

(10) Patent No.: US 7,117,152 B1
(45) Date of Patent: Oct. 3, 2006

(54) SYSTEM AND METHOD FOR SPEECH RECOGNITION ASSISTED VOICE COMMUNICATIONS

(75) Inventors: Arijit Mukherji, Sunnyvale, CA (US); Gerardo Chaves, San Jose, CA (US); Christopher A White, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 701 days.

(21) Appl. No.: 09/603,128

(22) Filed: Jun. 23, 2000

(51) Int. Cl.
*G10L 15/00* (2006.01)

(52) U.S. Cl. .............. 704/235; 704/270; 704/500; 704/209

(58) Field of Classification Search ............ 704/270.1, 704/9, 235, 500, 270; 370/352, 229, 260, 370/356; 703/6, 21; 709/232
See application file for complete search history.

(56) References Cited

U.S. PATENT DOCUMENTS

| | | | |
|---|---|---|---|
| 5,867,495 A * | 2/1999 | Elliott et al. ............. 370/352 |
| 5,963,551 A * | 10/1999 | Minko ................... 370/356 |
| 6,100,882 A * | 8/2000 | Sharman et al. .......... 704/235 |
| 6,345,239 B1 * | 2/2002 | Bowman-Amuah .......... 703/6 |
| 6,408,272 B1 * | 6/2002 | White et al. ............ 704/270.1 |
| 6,430,174 B1 | 8/2002 | Jennings et al. |
| 6,449,588 B1 * | 9/2002 | Bowman-Amuah .......... 703/21 |
| 6,463,404 B1 * | 10/2002 | Appleby ................... 704/9 |
| 6,490,550 B1 | 12/2002 | Hiri |
| 6,507,643 B1 | 1/2003 | Groner |
| 6,513,003 B1 | 1/2003 | Angell et al. |
| 6,584,098 B1 | 6/2003 | Dutnall |
| 6,600,733 B1 | 7/2003 | Deng |
| 6,601,029 B1 | 7/2003 | Pickering |
| 6,614,781 B1 | 9/2003 | Elliott et al. |
| 6,614,888 B1 | 9/2003 | Andreason |
| 6,618,369 B1 | 9/2003 | Huh et al. |
| 6,621,834 B1 | 9/2003 | Scherpbier et al. |
| 6,671,262 B1 * | 12/2003 | Kung et al. ............. 370/260 |
| 6,816,468 B1 * | 11/2004 | Cruickshank ............ 370/260 |
| 2002/0001302 A1 * | 1/2002 | Pickett ................... 370/352 |
| 2002/0031086 A1 * | 3/2002 | Welin .................... 370/229 |
| 2002/0089975 A1 * | 7/2002 | Vaziri et al. ............ 370/352 |
| 2002/0124100 A1 * | 9/2002 | Adams ................... 709/232 |

* cited by examiner

*Primary Examiner*—Richemond Dorvil
*Assistant Examiner*—Qi Han
(74) *Attorney, Agent, or Firm*—Baker Botts L.L.P.

(57) ABSTRACT

A communication system includes communications equipment having a voice input device, an acoustic output device, and a visual display device. The communications equipment receives voice information from a user using the voice input device, converts the voice information into text, and communicates packets encoding the voice information and the text to a remote location. The communications equipment also receives packets encoding voice and text information from the remote location, outputs the voice information using the acoustic output device, and outputs the text information using the visual display device.

23 Claims, 5 Drawing Sheets

SYSTEM AND METHOD FOR SPEECH RECOGNITION ASSISTED VOICE COMMUNICATIONS

TECHNICAL FIELD OF THE INVENTION

The present invention relates generally to voice communications and more particularly to a system and method for speech recognition assisted voice communications.

BACKGROUND OF THE INVENTION

In the search for low cost, long distance telephone service, the Internet offers an attractive alternative to traditional telephone networks. Through the Internet, users from around the world can place Internet protocol (IP) telephone calls without incurring additional costs other than those associated with maintaining a connection to the Internet. However, the Internet was not designed for real-time communications, and the underlying transport mechanisms of the Internet may result in delays and the loss of data. Thus, voice communications taking place over the Internet may suffer serious degradation in quality when packets relaying voice communications are lost or delayed.

SUMMARY OF THE INVENTION

In accordance with the present invention, a system and method for speech recognition assisted voice communications is provided which substantially eliminates or reduces disadvantages and problems associated with previous systems and methods. In a particular embodiment, the present invention satisfies a need for a packet-based communications session that provides both real-time voice communications and a reliable stream of text encoding those voice communications.

According to one embodiment of the present invention, a method for communicating voice and text associated with a packet-based voice communication session establishes the packet-based voice communication session with a remote location, receives voice information from a local participant in the packet-based voice communication session, and converts the voice information into text. The method generates packets encoding the voice information and the text and communicates the packets encoding the voice information and the text to the remote location. More specifically, the method generates a first stream of packets encoding the text and a second stream of packets encoding the voice information.

In accordance with another embodiment of the present invention, an interface for a telecommunications device receives packets encoding voice information and text from a remote location, wherein the voice information and the text are associated with a packet-based voice communication session. The interface displays the text using a visual display device and outputs the voice information using an acoustic output device. More specifically, the interface may receive local voice information from a local participant in the packet-based voice communication session, convert the local voice information into local text, and generate packets encoding the local voice information and the local text. The interface may then communicate the packets encoding the local voice information and the local text to the remote location.

The invention provides a number of technical advantages. The system provides a method for communicating voice information using a packet-based communications network while providing a reliable stream of text encoding the voice communications. Each of the participants in the telephone conversation may display a running transcript of the conversation. This transcript provides a reference during the conversation, allows for more effective communications during periods of low quality voice communications, and may be saved to a file for later use. In addition, either the sending or receiving party's system may convert the text stream into different languages.

Other technical advantages of the present invention will be readily apparent to one skilled in the art from the following figures, descriptions and claims.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
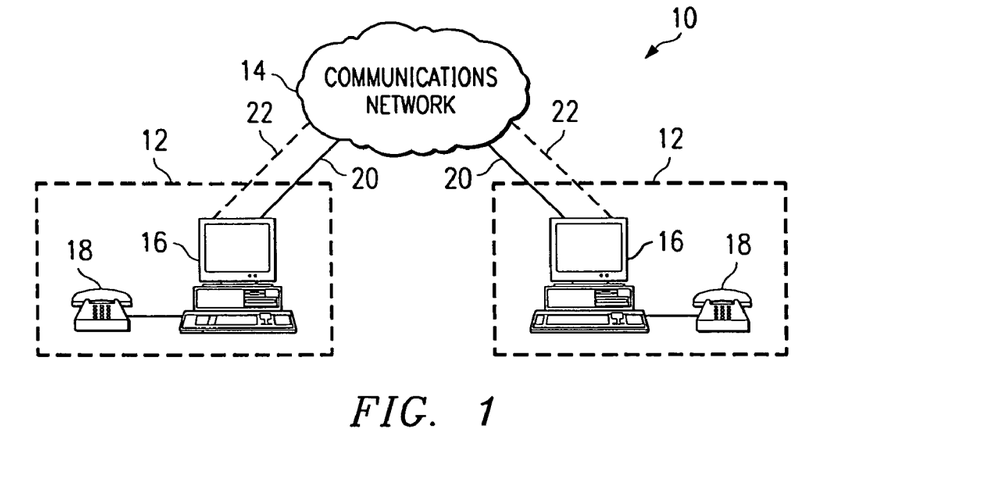
FIG. 1 is a block diagram illustrating a system having devices supporting voice and text communications in accordance with the teachings of the present invention.

FIG. 1 illustrates a communications system, indicated generally at 10, that includes communications equipment 12 coupled to a communications network 14. In general, system 10 provides packet-based voice communications between communications equipment 12 located at different locations while simultaneously providing an underlying text communications stream encoding the voice communications.

Communications equipment 12 includes a computing device 16 and a communications interface 18. Communications interface 18 provides input and output of acoustic signals using any suitable input device, such as a microphone, and any suitable output device, such as a speaker. In a particular embodiment, communications interface 18 may be a speaker-phone. Computing device 16 represents any hardware and/or software that provides an interface between communications equipment 12 and communications network 14, processes the receipt and transmission of packet-based voice communications, converts communications between voice and text, displays text, and performs other appropriate processing and control functions. For example, computing device 16 may be a general purpose computing device such as a laptop or desktop computer, a specialized communications device such as an Internet protocol (IP) telephone, or other suitable processing or communications device.

While computing device 16 and communications interface 18 are shown as separate functional units, these components may be combined into one device or may be separated into smaller functional components when appropriate. In a particular embodiment, computing device 16 represents a general purpose computer coupled to the Internet and running IP telephony communications software. Communications interface 18 represents a speaker and a microphone coupled to and/or integral with the computer.

Network 14 represents any collection and arrangement of hardware and/or software providing packet-based communications between communications equipment 12 at different locations. For example, network 14 may be one or a collection of components associated with the public-switched telephone network (PSTN), local area networks (LANs), wide area networks (WANs), a global computer network such as the Internet, or other suitable wireline or wireless communications technology that supports communications between multiple devices.

In operation, users of system 10 establish a packet-based voice communications session on communications network 14 between communications equipment 12 at multiple locations. During setup or at any other appropriate time during the session, the participants may establish two communications streams using network 14, a voice link 20 and a text link 22. At each location, a participant in the communications session speaks, and computing device 16 receives this local voice information using communications interface 18. Computing device 16 encodes the voice information into packets and communicates these packets to remote communications equipment 12 using voice link 20. In addition, computing device 16, using any suitable speech recognition software and/or hardware, converts the voice information into text, encodes the text into packets, and communicates these packets to remote communications equipment 12 using text link 22. This dual-stream session provides voice over packet (VoP) communications while simultaneously providing a reliable stream of text encoding these voice communications. Computing device 16 may use any appropriate speech recognition hardware and/or software for converting between voice and text. For example, computing device 16 may operate using IP telephony software which contains speech recognition capabilities or may interface packet-based communications software with commercially available speech recognition software.

Figure 2:
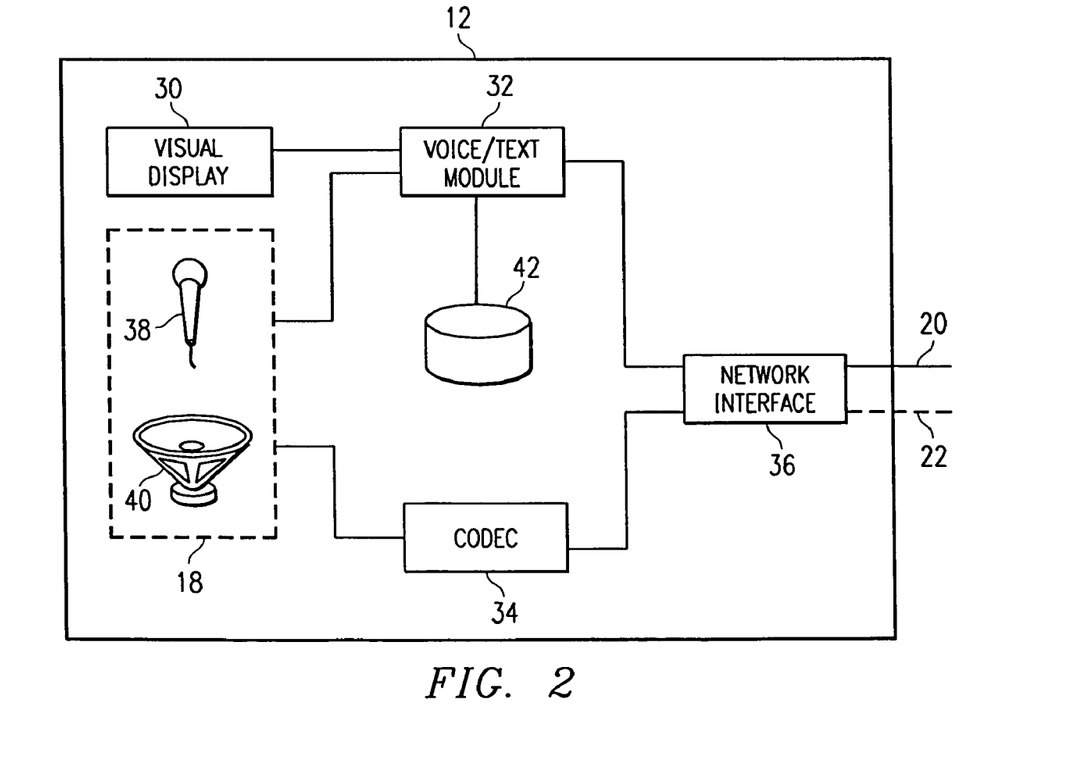
FIG. 2 is a block diagram illustrating an exemplary communications device from the system.

FIG. 2 is a block diagram illustrating in more detail the functional components of communications equipment 12, including the components of both computing device 16 and communications interface 18. Communications equipment 12 includes communications interface 18, a visual display 30, a voice/text module 32, a coder/decoder (CODEC) 34, and a network interface 36. Network interface 36 provides connectivity between communications equipment 12 and network 14 using any suitable wireless or wireline communications protocol. For example, network interface 36 may be a computer modem coupled to an Internet service provider (ISP), a wireless network interface device, or other appropriate communications interface. Network interface 36 transmits and receives packet-based communications using any suitable communications protocol, such as Internet protocol (IP), an asynchronous transfer mode (ATM) protocol, or other suitable communications protocol.

CODEC 34 encodes voice information received from a microphone 38 into packets of data for transmission by network interface 36. CODEC 34 streams packets encoding real-time data such as audio or video signals using appropriate parsing, compressing, encoding, packetizing, buffering, and processing. In addition, CODEC 34 decodes packets of information received from network interface 36 into audio signals for output using a speaker 40. Decoding encompasses any steps necessary for receiving a real-time stream of data. For example, CODEC 34 may decompress the information encoded in the received packets, separate out audio frames, maintain a jitter buffer, and provide other suitable processing for extracting audio signals from received packets. Microphone 38 and speaker 40 represent suitable input and output devices for receiving and outputting audio signals from and to users of communications equipment 12.

Voice/text module 32 includes speech recognition modules capable of converting voice information received using microphone 38 into text and then encoding the text into packets for communication using network interface 36. Alternatively, voice/text module 32 may receive partially or fully processed voice information from CODEC 34. For example, voice/text module 32 may receive and process information that has been digitized by CODEC 34. Voice/text module 32 may also display the text encoding the voice information received from microphone 38 using visual display 30, allowing a user to view text of his or her spoken words during a conversation.

In addition, voice/text module 32 receives packets encoding voice information from a remote location, retrieves the remote text information from the packets, and displays the remote text information using visual display 30. Thus, communications equipment 12 may display a substantially real-time transcript of a voice communications session for reference during the conversation, to supplement the voice communications during periods of reduced transmission quality, or to save for future reference. This transcript may include both local and remote voice communications.

Voice/text module 32 may also provide speech synthesis capabilities. For example, voice/text module 32 may receive packets encoding remote voice information from network interface 36 and use this remote voice information to generate audio signals using speaker 40. Moreover, voice/text module 32 may work in conjunction with CODEC 34 to supplement poor quality voice communications with synthesized speech. In addition, voice/text module 32 may translate text from a first language to a second language. For example, text received in English, either from microphone 38 or in packets from network interface 36, may be translated to any other language for display using visual display 30 or communication using network interface 36. Furthermore, this translation capability may be used in conjunction with speech synthesis to provide a translated audio signal for output using speaker 40.

Communications equipment 12 also includes a memory 42 storing data and software. Memory 42 represents any one or combination of volatile or non-volatile, local or remote devices suitable for storing data, for example, random access memory (RAM) devices, read-only memory (ROM) devices, magnetic storage devices, optical storage devices, or any other suitable data storage devices. Memory 42 may store transcripts of current and previous communication sessions, communications applications, telephony applications, interface applications, speech synthesis applications, speech recognition applications, language translation applications, and other appropriate software and data.

In operation, a user of communications equipment 12 establishes a packet-based voice communications session with a remote communications device. At any suitable time during the communications session, communications equipment 12 may determine that the remote device provides for a voice and text communications session. Based on this determination, communications equipment 12 may establish a voice and text session with the remote device at any time. Communications equipment 12 may establish the voice and text session during the setup of the initial call, when a degradation in the quality of the voice communications is detected, or at any other appropriate time. In a particular embodiment, a degradation in the quality of the voice link triggers an automatic initialization of the voice-to-text capabilities. Hence, at any suitable time during or in setup of a communications session, equipment 12 establishes voice link 20 and text link 22 with a remote communications device.

During the voice and text session, communications equipment 12 receives voice information using microphone 38. The voice information is then encoded into packets using CODEC 34, and these packets are transmitted to the remote device on voice link 20 using network interface 36. Substantially simultaneously, the voice information is converted into text and encoded into packets using voice/text module 32, and these packets are communicated to the remote location on text link 22 using network interface 36. Thus, communications equipment 12 generates dual communications streams. One stream communicates packets encoding the text of the voice conversation, and the other stream communicates packets encoding the voice information. Using two different streams, the voice and text packets maybe assigned different levels of service. However, system 10 contemplates combining the two streams such that text information "piggybacks" in the voice packets. Thus the text information may be communicated in the same packet as voice information.

Network interface 36 may communicate packets encoding the voice and text information using any suitable transmission protocol. Voice and text information streams may be communicated using the same protocol or using different protocols. In a particular embodiment, the two communications streams are transmitted using different communications protocols. According to this embodiment, network interface 36 communicates the packets encoding voice information using a communications protocol such as user datagram protocol (UDP) and communicates the packets encoding the text using a more reliable communications protocol, such as transmission control protocol (TCP). By using a more reliable communications protocol for the transmission of packets encoding text information, the stream of text information will be maintained even during periods of low network quality. These text packets will provide, even if somewhat delayed, a virtually guaranteed communications link.

While the preceding descriptions detail specific functional modules, system 10 contemplates implementing each of the components in communications equipment 12 using any suitable combination and arrangement of hardware and/or software. In addition, functionalities from each of these components may be combined or separated into smaller functional units when appropriate, and any of the methods or functionalities described may be implemented by a computer program stored on a computer readable medium.

Figure 3:
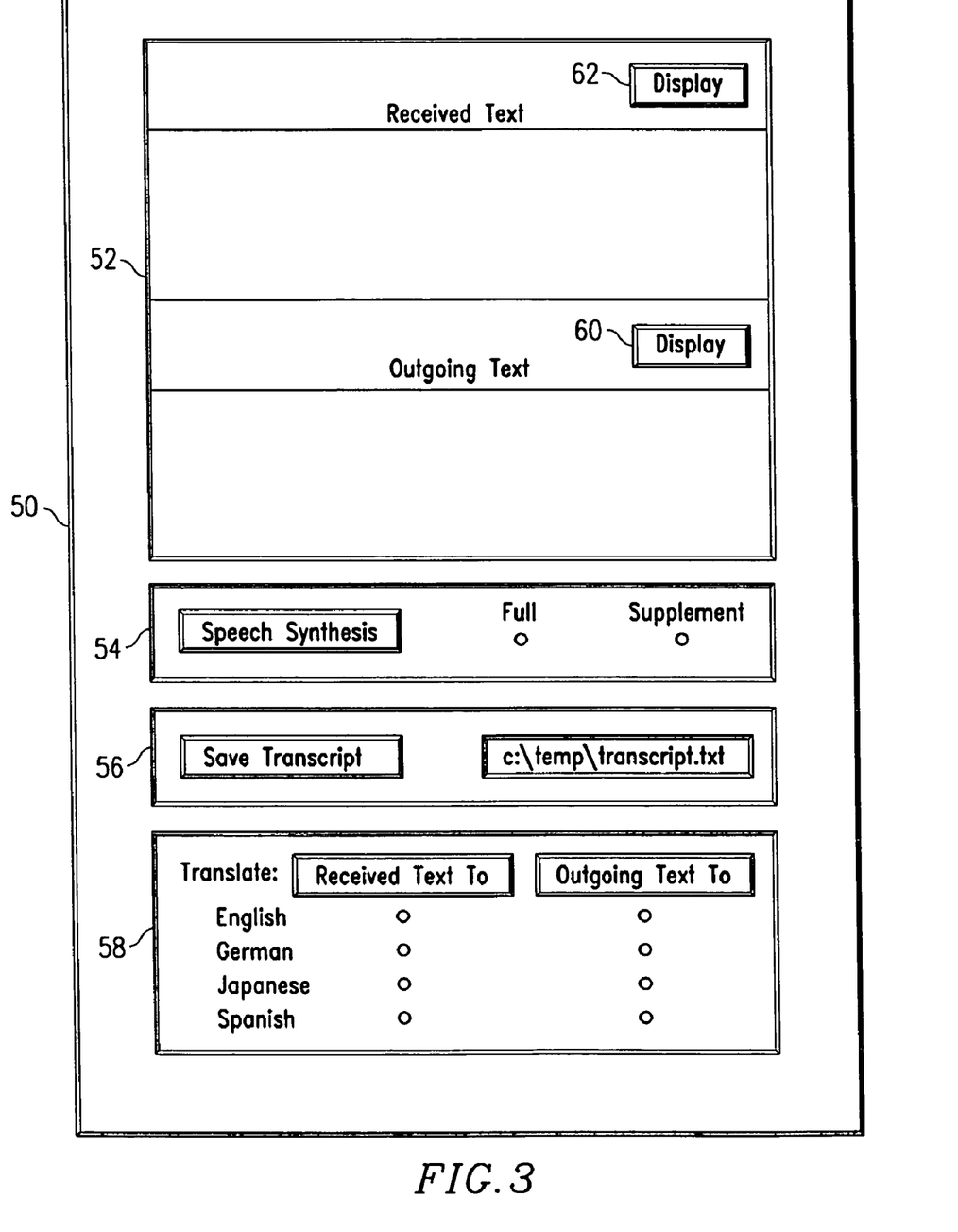
FIG. 3 is an exemplary user interface for the communications device.

FIG. 3 illustrates a graphical user interface 50 for communications equipment 12. Graphical user interface 50 includes a text display 52, speech synthesis options 54, transcript options 56, and translation options 58. In general, communications equipment 12 presents graphical user interface 50, which displays the text associated with a voice communications session and allows for the selection of various options.

Text display 52 provides both a received text field for the display of text information received from a remote location and an outgoing text field for the display of text from voice/text module 32 based on microphone 38 input. While text display 52 in this example displays incoming and outgoing text in different fields, system 10 contemplates any appropriate method for displaying text associated with voice communications sessions, such as a unified field for the display of all associated text. Moreover, text display 52 may display only received text or only outgoing text based on the options selected and/or the capabilities of the communicating devices.

Speech synthesis options 54 toggle ON and OFF speech synthesis, and select between a full synthesis, where speech is synthesized based solely on text communications, and a supplement feature, in which voice information is supplemented using speech synthesized from the text packets. Transcript options 56 control whether a transcript of a communications session is saved to memory 42. In a particular embodiment, communications equipment 12 automatically saves a temporary transcript of a voice communications session so that a user may decide during or after a conversation whether to permanently save the transcript.

Translation options 58 control the translation of transmitted and received text. Thus, a user of communications equipment 12 may select to translate outgoing text before transmission to a remote location or may select to translate text received from the remote location. While this example shows a specific list of languages available for translation, system 10 contemplates providing translation capabilities to and from any languages. In addition, user interface 52 may provide further options for specifying translation options 58, such as the language used by the remote location. Furthermore, translation options 58 may be used in conjunction with speech synthesis options 54 to generate translated speech during a communications session.

The features listed and the arrangement of these features on graphical user interface 50 illustrate only a specific example of features that may be supported by communications equipment 12. System 10 contemplates graphical user interface 50 containing any combination and arrangement of features for controlling a voice and text communication session. For example, graphical user interface 50 may also display a telephone number pad along with other buttons providing various telephony features, thus providing a fully functional computer-implemented telephone.

Figure 4:
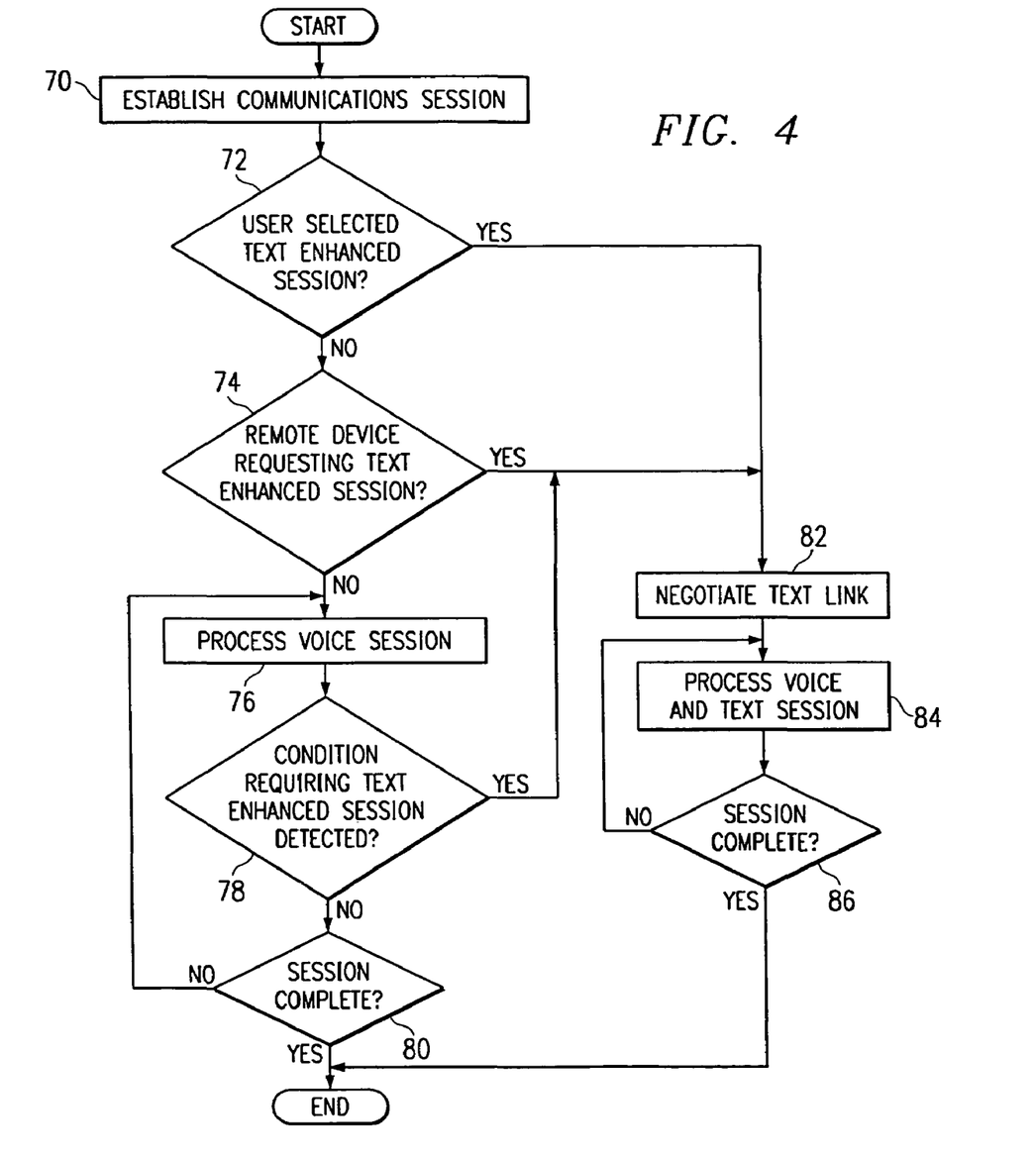
FIG. 4 is a flowchart illustrating a method for establishing a communications session and negotiating voice and text communications.

FIG. 4 is a flowchart illustrating a method for establishing a communications session and negotiating voice and text communications using communications equipment 12. Communications equipment 12 establishes a communications session with a remote location at step 70. This session communicates voice information using any suitable packet based communications protocol, and may additionally include the communication of data, video, or other information using any suitable transmission protocol.

Communications equipment 12 determines whether a user has selected text enhanced communications at step 72. If so, communications equipment 12 negotiates text link 22 with the remote device at step 82. If the user has not selected a text enhanced session, communications equipment 12 determines whether the remote device has requested a text enhanced communication session at step 74. If so, communications equipment 12 negotiates text link 22 with the remote device at step 82. If the remote device has not requested, and the user has not selected, a text enhanced session, communications equipment 12 processes a normal voice communications session with the remote device at step 76.

During this voice session, communications equipment 12 monitors activity to determine whether a condition requiring text enhanced communications has been detected at step 78.

This includes any suitable condition, such as a degradation in the quality of voice communications, a request from the user or the remote device, or any other suitable triggering event. If no such condition has been detected, communications equipment 12 determines whether the session has completed at step 80 and, if not, continues processing the voice session step 76. However, if a condition requiring a text enhanced session has been detected, communications equipment 12 negotiates text link 22 with the remote device at step 82.

Once an appropriate triggering event has been detected, and communications equipment 12 has negotiated text link 22 with the remote device, communications equipment 12 processes the voice and text communications session at step 84. This processing of voice and text communications is discussed in detail in the following flowcharts. Moreover, while this flowchart illustrates specific events that may trigger the initialization of a voice and text communication session, communications equipment 12 may negotiate and establish voice and text communications for any suitable reason. In addition, system 10 contemplates using any appropriate method for establishing voice and text communications between communications equipment 12 and a remote device.

Figure 5:
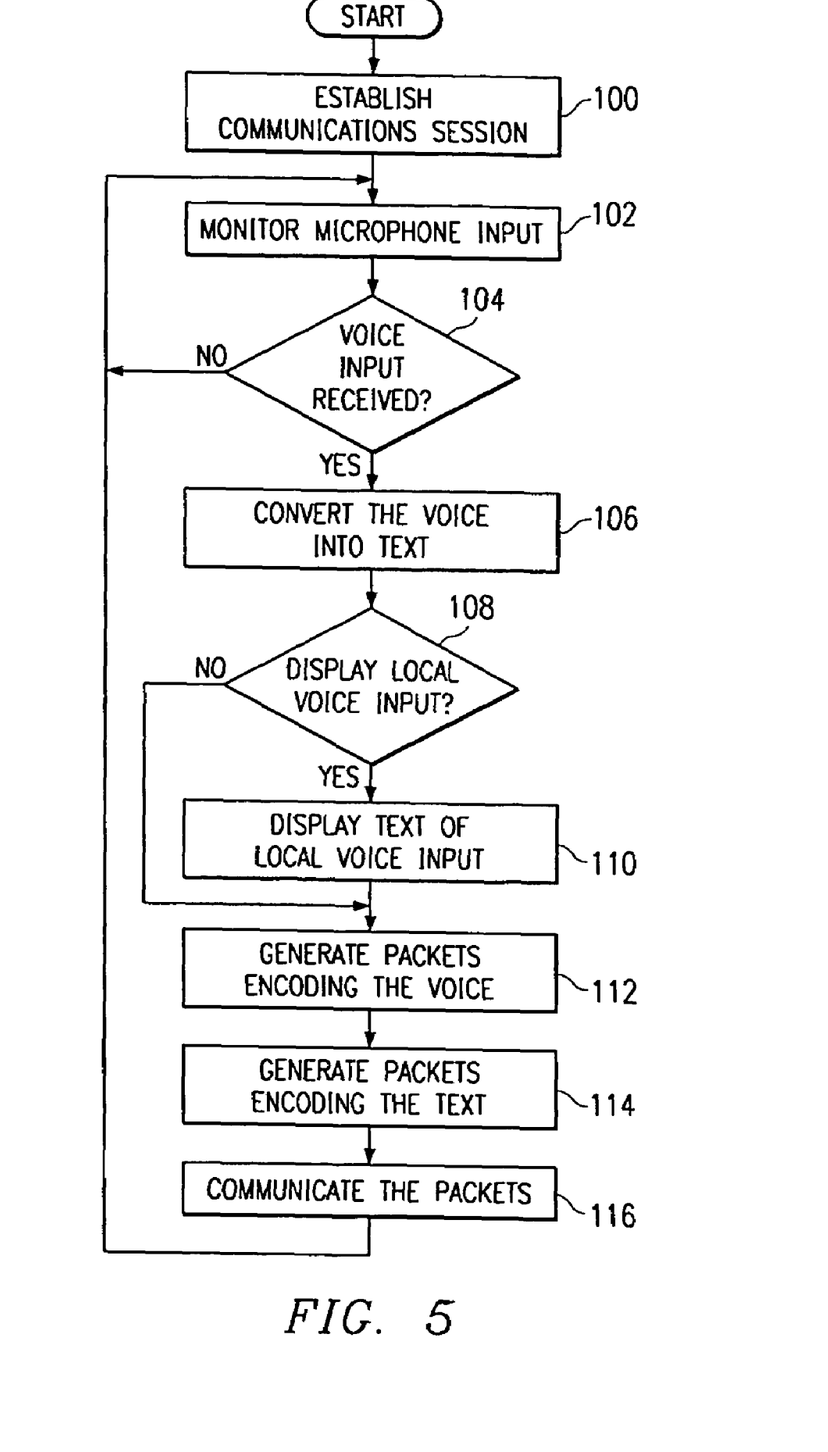
FIG. 5 is a flowchart illustrating a method for processing voice communications received from a user.

FIG. 5 is a flowchart illustrating a method for processing voice communications using communications equipment 12. Communications equipment 12 establishes a communications session with a remote location at step 100. This session communicates voice information using any suitable packet-based communications protocol, and may additionally include the communication of data, video, or other information using any suitable transmission protocol. Communications equipment 12 monitors input received by microphone 38 and determines whether input of voice information has been received at steps 102 and 104 respectively. If communications equipment 12 detects no input, monitoring is resumed at step 102.

Upon detecting input, communications equipment 12 converts the voice information received into text at step 106. Communications equipment 12 determines whether local voice display is enabled at step 108. Local voice display may be automatic or may be selected by a user through any appropriate interface, such as a DISPLAY button 60 on user interface 50. If not enabled, flow skips to step 112. If local voice display is enabled, communications equipment 12 displays local voice information received using visual display 30 at step 110. Communications equipment 12 generates packets encoding the voice information and packets encoding the text at steps 112 and 114 respectively. Communications equipment 12 communicates the packets to the remote location using network interface 36 at step 116. In addition, the local voice communications may optionally be translated into various languages for display and/or transmission to the remote location.

While this flowchart illustrates an exemplary method for processing voice communications using communications equipment 12, system 10 contemplates using any appropriate method for processing voice communications using dual communications streams to transmit voice information and text encoding the voice information using a packet-based protocol. Moreover, system 10 contemplates many of the steps in this flowchart taking place simultaneously and/or in different orders than shown. For example, packets encoding the voice information may be generated and communicated as soon as possible, while a copy of the voice information is converted to text, encoded into packets, and then communicated.

Figure 6:
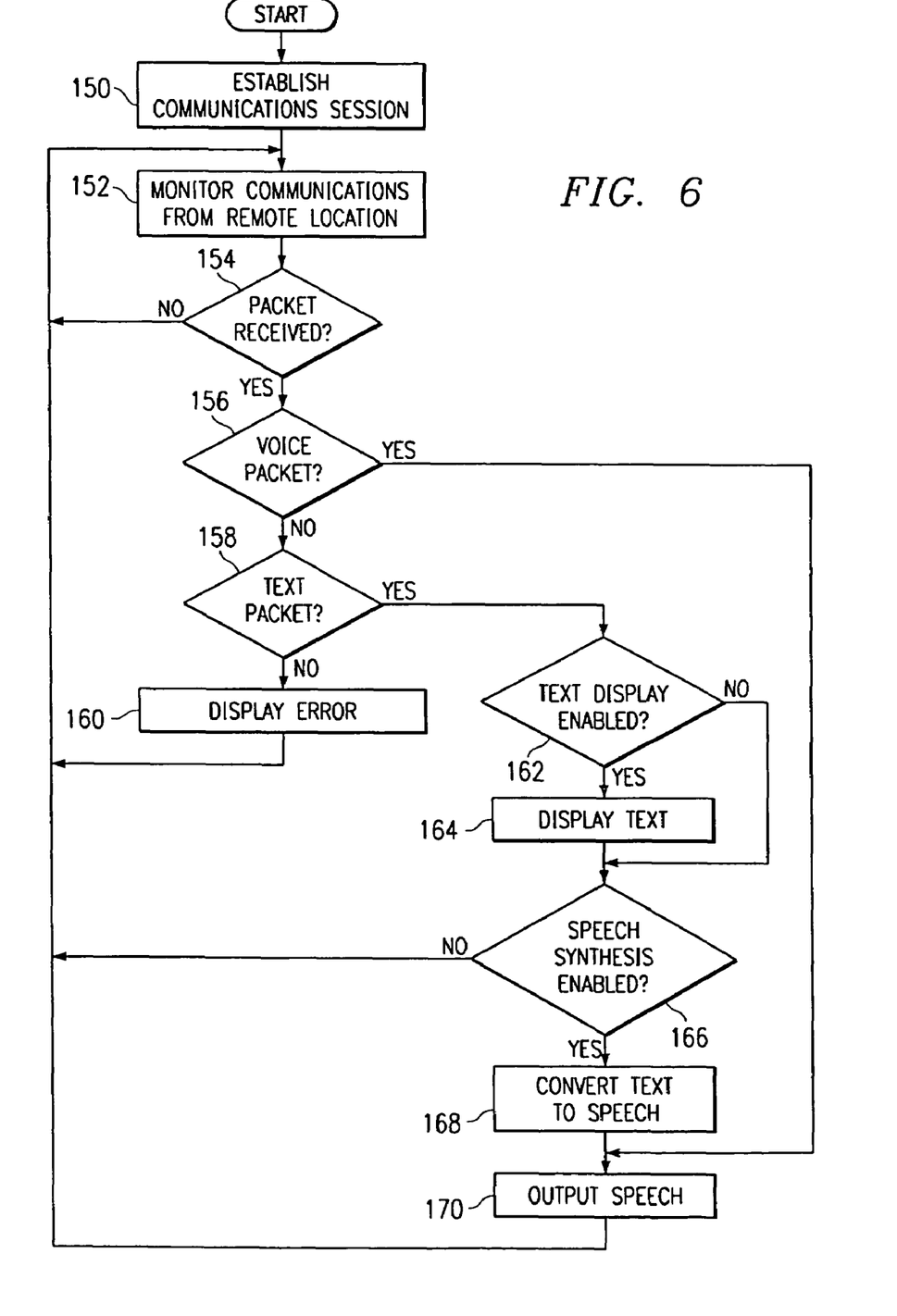
FIG. 6 is a flowchart illustrating a method for processing voice and text communications received from a remote communications device.

FIG. 6 is a flowchart illustrating a method for processing communications received from a remote participant in a communications session. Communications equipment 12 establishes a communication session with a remote location using network interface 36 at step 150. Communications equipment 12 monitors communications from the remote location and determines whether packets have been received at steps 152 and 154 respectively. If no packets have been received, communications equipment 12 continues monitoring communications at step 152. If a packet has been received, communications equipment 12 determines whether the packet encodes voice information at step 156.

In a particular embodiment, packets encode both voice and text information. Thus, equipment 12 must extract the different types of information from the packet for processing by the appropriate modules. However, in this example, communications equipment 12 receives voice and text packets using separate communications streams. Therefore, if a voice packet is received, communications equipment 12 outputs the voice information as an audio speech signal using speaker 40 at step 170. However, in certain circumstances, communications equipment 12 may suppress the output of signals received in voice packets. For example, if a user has enabled speech synthesis or a user has enabled text to translated speech, communications equipment 12 may disable the output of signals from voice packets to prevent conflicting outputs.

If the packet does not encode voice information, communications equipment 12 determines whether the packet encodes text at step 158. If not, communications equipment 12 may optionally display an error message indicating the receipt of an unknown packet at step 160, and return to monitoring communications at step 152. If a text packet has been received, communications equipment 12 determines whether text display is enabled at step 162. Text display may be enabled automatically or using any suitable user interface, such as a DISPLAY button 62 on user interface 50. If text display is not enabled, flow skips to step 166. However, if text display is enabled, communications equipment 12 displays the received text using visual display 30 at step 164. In displaying text, communications equipment 12 may translate the received text according to translation options 58 selected on graphical user interface 50.

Communications equipment 12 determines whether speech synthesis is enabled at step 166. Speech synthesis may be enabled using any appropriate interface, such as synthesis options 54 on user interface 50. If speech synthesis is not enabled, communications equipment 12 resumes monitoring communications at step 152. If speech synthesis is enabled, communications equipment 12 converts the received text to speech and outputs the speech at steps 164 and 170 respectively. This conversion of text to speech may also translate according to translation options 58 selected.

The preceding flowcharts illustrate only exemplary methods for communicating dual streams encoding voice and text information based on received voice input, and for processing the receipt of these dual communications streams from a remote location. Communications equipment 12 contemplates many of the steps in these flowcharts taking place simultaneously and/or in different orders than as shown. Furthermore, communications equipment 12 contemplates using methods with additional steps, fewer steps, or different steps, so long as the methods remain appropriate for providing a packet-based voice communication session supplemented by a stream of text encoding the voice information.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for communicating voice and text associated with a packet-based voice communications session comprising:
   receiving local voice information from a local participant in a packet-based voice communications session having at least one remote participant;
   converting the local voice information into local text;
   generating a first stream of packets encoding the local text;
   generating a second stream of packets encoding the local voice information;
   detecting a degradation in a quality of the packet-based voice communications session;
   in response to detecting the degradation in the quality of the packet-based voice communications session, communicating the first stream of packets to the remote participant using transmission control protocol (TCP); and
   communicating the second stream of packets to the remote participant using user datagram protocol (UDP);
   wherein the packet-based voice communications session comprises an Internet protocol (IP) telephony communications session.

2. The method of claim 1, further comprising:
   receiving packets encoding remote voice information and remote text from the remote participant;
   outputting the remote voice information using an acoustic output device; and
   displaying the remote text using a visual output device.

3. The method of claim 1, further comprising determining that the packet-based voice communications session provides for a text communications session before communicating the first stream of packets to the remote participant.

4. The method of claim 1, further comprising displaying the local text using a visual output device.

5. An interface for a telecommunications device, the interface operable to:
   receive packets encoding remote voice information and remote text of the voice information from a remote participant, wherein the remote voice information and the remote text are associated with a packet-based voice communications session with the remote participant;
   detect a degradation in a quality of the packet-based voice communications session;
   display using a visual output device; and
   output the remote voice information using an acoustic output device;
   wherein the packets encoding remote voice information and remote text comprise:
      a first stream of packets encoding remote text generated by converting the remote voice information; and
      a second stream of packets encoding remote voice information from the remote participant;
   wherein the first stream of packets is communicated using transmission control protocol (TCP) in response to detecting the degradation in quality of the packet-based voice communications session and the second stream of packets is communicated using user datagram protocol (UDP); and
   wherein the packet-based voice communications session comprises an Internet protocol (IP) telephony communications session.

6. The interface of claim 5, wherein the interface comprises a computer program embodied in a computer readable medium.

7. The interface of claim 5, further operable to output the remote voice information using speech synthesis to convert the remote text into an audio output.

8. The interface of claim 5, further operable to translate the remote text from a first language to a second language.

9. The interface of claim 5, further operable to determine that the packet-based voice communications session provides for a text communications session before receiving the second stream of packets.

10. The interface of claim 5, further operable to:
    receive local voice information from a local participant in the packet-based voice communications session;
    convert the local voice information into local text;
    generate packets encoding the local voice information and the local text; and
    communicate a first stream of packets encoding the local voice information and a second stream of packets encoding the local text to the remote participant.

11. The interface of claim 5, further operable to display both the local text and the remote text to the local participant using a visual output device.

12. Telephony communications software for communicating voice and text associated with a packet-based voice communications session, the software embodied in a computer readable medium and operable to:
    establish the packet-based voice communications session with a remote location;
    receive local voice information from a local participant in the packet-based voice communications session;
    convert the local voice information into local text;
    generate a first stream of packets encoding the local text;
    generate a second stream of packets encoding the local voice information;
    detect a degradation in a quality of the packet-based voice communications session;
    in response to detecting the degradation in the quality of the packet-based voice communications session, communicate the first stream of packets to the remote location using transmission control protocol (TCP); and
    communicate the second stream of packets to the remote location using user datagram protocol (UDP);
    wherein the packet-based voice communications session comprises an Internet protocol (IP) telephony communications session.

13. The software of claim 12, further operable to:
    receive packets encoding remote voice information and remote text from the remote location;
    output the remote voice information using an acoustic output device; and
    display the remote text using a visual output device.

14. The software of claim 12, further operable to determine that the packet-based voice communications session provides for a text communications session before communicating the first stream of packets to the remote location.

15. The software of claim 12, further operable to display the local text using a visual output device.

16. A communications system for communicating voice and text associated with a packet-based voice communications session comprising:

a first communications device operable to establish the communications session with a second communications device, to receive local voice information from a local participant in the communications session, convert the local voice information into local text, to generate a first stream of packets encoding the local text, to generate a second stream of packets encoding the local voice information, to detect a degradation in a quality of the packet-based voice communications session, to communicate the first stream of packets to the second communications device using transmission control protocol (TCP) in response to detecting the degradation in the quality of the packet-based voice communications session, and to communicate the second stream of packets to the second communications device using user datagram protocol (UDP); and the second communications device operable to receive the packets from the first communications device, display the local text using a visual display device, and output the local voice information using an acoustic output device;

wherein the communications session comprises a voice over packet (VoP) telephone call.

17. The communications system of claim 16, wherein the second communications device is further operable to translate the local text from a first language to a second language.

18. The communications system of claim 16, wherein the second communications device is further operable to:
generate an audio speech signal using the local text; and
output the audio speech signal using the acoustic output device.

19. The communications system of claim 16, wherein the first communications device is further operable to determine that the packet-based voice communications session provides for a text communications session before communicating the first stream of packets to the second communications device.

20. A device for communicating voice and text associated with a packet-based voice communications session comprising:

means for receiving local voice information from a local participant in a packet-based voice communications session having at least one remote participant;

means for converting the local voice information into local text;

means for generating a first stream of packets encoding the local text;

means for generating a second stream of packets encoding the local voice information;

means for detecting a degradation in a quality of the packet-based voice communications session;

means for communicating the first stream of packets to the remote participant using transmission control protocol (TCP) in response to detecting the degradation in the quality of the packet-based voice communications session; and means for communicating the second stream of packets to the remote participant using user datagram protocol (UDP);

wherein the packet-based voice communications session comprises an Internet protocol (IP) telephony communications session.

21. The device of claim 20, further comprising:

means for receiving packets encoding remote voice information and remote text from the remote participant;

means for outputting the remote voice information using an acoustic output device; and means for displaying the remote text using a visual output device.

22. The device of claim 20, further comprising means for determining that the packet-based voice communications session provides for a text communications session.

23. The device of claim 20, further comprising means for displaying the local text using a visual output device.

* * * * *